United States Patent [19]

Shields

[11] Patent Number: 5,108,213

[45] Date of Patent: Apr. 28, 1992

[54] CLAMPING ASSEMBLY

[75] Inventor: John Shields, Jackson, Miss.

[73] Assignee: Edgewater Medical Equipment Systems, Inc., Bedford Heights, Ohio

[21] Appl. No.: 673,942

[22] Filed: Mar. 22, 1991

[51] Int. Cl.⁵ .............................................. B25G 3/00
[52] U.S. Cl. ........................................ 403/18; 403/59; 248/286
[58] Field of Search ...................... 403/59, 18; 248/286

[56] References Cited

U.S. PATENT DOCUMENTS

| | | | |
|---|---|---|---|
| 3,339,913 | 9/1967 | Anderson | 248/298 X |
| 3,357,726 | 12/1967 | Gabrielson | 403/59 |
| 4,018,412 | 4/1977 | Kees, Jr. et al. | 248/286 X |
| 4,547,092 | 10/1985 | Vetter et al. | 403/59 |
| 4,747,569 | 5/1988 | Hoshino | 248/286 |
| 4,865,484 | 9/1989 | McConnell | 403/59 |

*Primary Examiner*—Andrew V. Kundrat
*Attorney, Agent, or Firm*—Pearne, Gordon, McCoy & Granger

[57] ABSTRACT

A clamping assembly for connecting a support rod that supports medical accessories to a medical table, the clamping assembly having independently operable adjustments for releasably securing the assembly to the rail of the medical table; controlling the rotational positioning of the support rod; and regulating the longitudinal displacement of the support rod. The assembly includes a cam handle that regulates a camming surface. When the cam handle is rotated the camming surface translates a locking lug within an aperture of the assembly until the locking lug engages the rail of the medical table whereby the assembly is secured to the rail. The locking lug may be released from the rail by rotating the cam handle in the opposite direction. The rotational movement of the support rod relative to the housing of the assembly is controlled by the interaction of a toothed locking ring disposed upon a shaft extending from the housing and a set of circumferentially disposed teeth fixed upon the housing. A compression spring disposed upon the shaft is used to bias the toothed locking ring away from the housing and a locking nut is used to meshingly engage the teeth and secure them into a fixed position thereby preventing the shaft and consequently the support rod from rotating relative to the housing. The support rod is inserted through an aperture within the shaft and a pair of rod locking rings are disposed upon the shaft, one on each side of the aperture. A handle is threaded within the end of the shaft and is used to urge the support rod against one of the locking rings to secure the support rod in position.

16 Claims, 1 Drawing Sheet

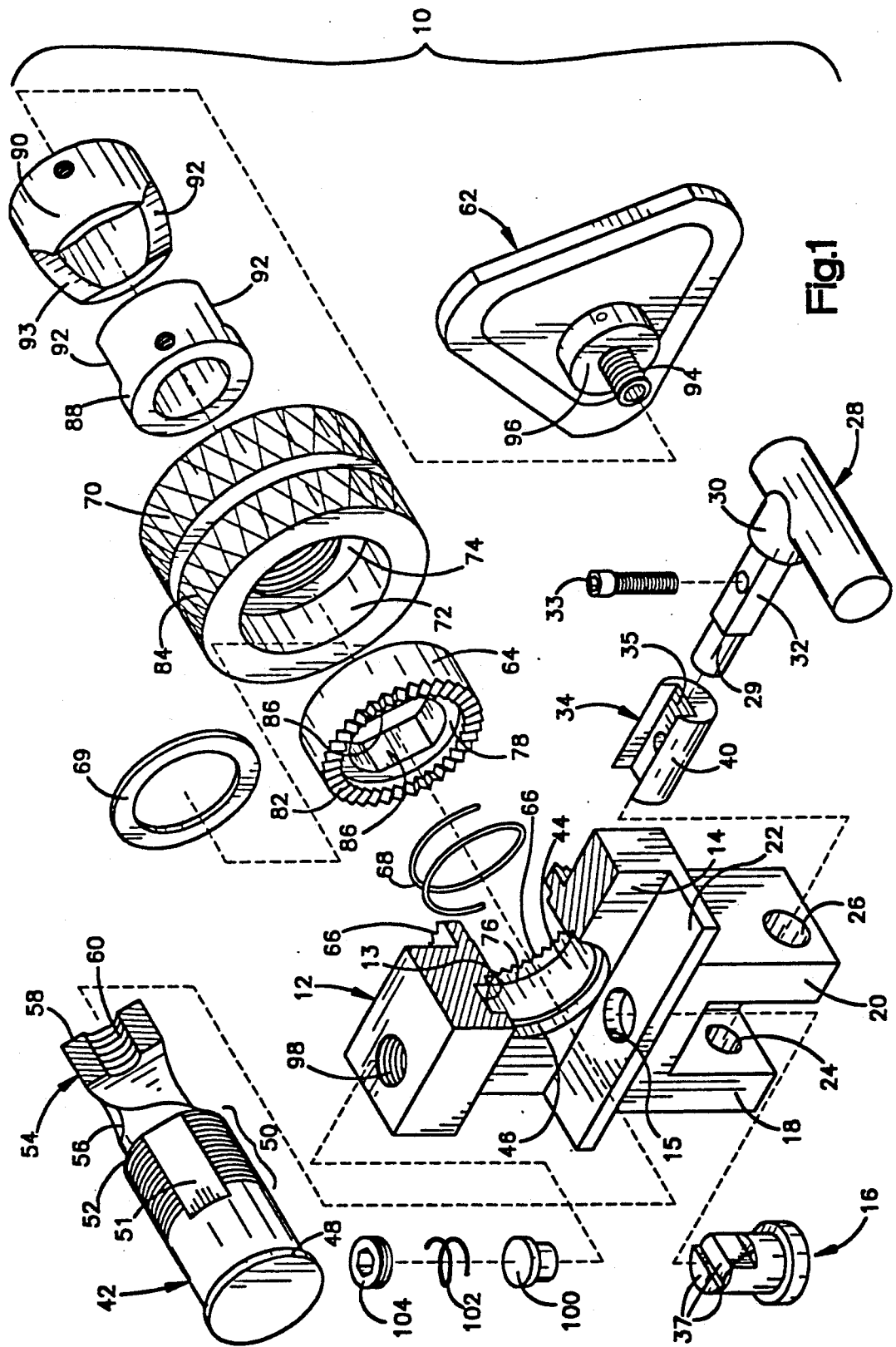

5,108,213

CLAMPING ASSEMBLY

FIELD OF THE INVENTION

This invention relates generally to clamping assemblies, and in particular to a clamping assembly for adjustably connecting accessories, such as hangers, stirrups, or arm supports, to the rail of a medical table via a support rod, the clamping assembly including independent adjustment means for rotating and longitudinally displacing the support rod relative to the medical table.

DESCRIPTION OF THE PRIOR ART

Various types of clamping devices have been developed for adjustably securing accessories to the side rail or track of a medical table. Most of these devices are designed to perform two primary clamping functions: 1) adjustably clamping the device to the rail or track; and 2) adjustably clamping the accessory to the device. These clamping functions are performed in various ways.

U.S. Pat. No. 4,547,092, issued to Vetter et al. on Oct. 15, 1985, discloses an accessory clamp for a medical table that includes an adjustment mechanism for securing the clamp to the table and another adjustment mechanism for adjusting the relationship of the accessory to the table. The mechanism for securing the clamp to the table includes a control knob with a threaded socket that receives the threaded end of a control shaft that extends completely through the bore of the clamp. The opposite end of the shaft includes a contact member received within a recess formed within the base of the clamp. The control knob can be used to move the contact member longitudinally thereby tightening or loosening the clamp relative to the track or rail of a medical table.

The adjustment mechanism of Vetter et al. pertaining to the accessory includes an inner base section and an outer cup section, each containing an annular row of circumferentially arranged teeth that cooperate with each other. A rod for supporting an accessory is inserted through an off-centered opening in the cup section. A handwheel is used to wedge the support rod tightly in place within the opening. The handwheel is also used to engage or disengage the inner base section with the outer cup section so the accessory can be locked into place or swiveled. Tightening or loosening the handwheel performs the dual functions of locking or releasing both the support rod of the accessory and the swivel mechanism, thereby allowing simultaneous adjustment of the longitudinal displacement of the support rod and rotational adjustment of the swivel mechanism.

One apparent disadvantage of the mechanism of Vetter et al. for adjusting the accessory is that if a user wants to loosen the handwheel in order to swivel the accessory, the grip on the accessory support rod must also be loosened. This may lead to the undesirable result of the accessory support rod inadvertently moving longitudinally when swivelling the accessory, especially if pressure is being exerted upon the support rod by a patient's limb, for example. This inadvertent movement may cause injury to the user or patient and is certainly an inconvenience because the user must take measures to assure that the support rod doesn't move longitudinally when swivelling the accessory, unless, of course, longitudinal movement is desired.

To help overcome the foregoing problem, a spring is located within the outer cup section that creates a slight interference between itself and the accessory support rod so that the spring exerts limited restraining force on the support rod. As indicated in Vetter et al., this restraining force may be easily overcome by the user, but is enough to prevent random or unintentional movement of the support rod that might otherwise occur if there were no restraint at all. However, it has been discovered that the resistance provided by the spring is usually not sufficient to prevent inadvertent movement of the support rod, especially when the support rod is supporting relatively heavy objects.

With the advent of power operated medical tables capable of assuming numerous positions and the need to provide specialized treatment for patients, it has become highly desirable to provide a clamping device capable of independently controlling the rotational adjustment and longitudinal displacement of a support rod supporting an accessory. Furthermore, it is also desirable to provide such a clamping device so it can be easily attached to a medical table or chair and easily loosened for movement along the rail.

SUMMARY OF THE INVENTION

Accordingly, a preferred embodiment of the present invention provides a clamping assembly that includes a housing having means for releasably securing the clamping assembly to a fixture, such as the rail of a medical table. The clamping assembly further includes means integrated with the housing for rotationally adjusting a support rod about an axis that is substantially perpendicular to the support rod's longitudinal axis, and for securing the rotational adjustment in a fixed position relative to the housing. Means for controlling the longitudinal displacement of the support rod is provided and can be operated independently of the means for rotationally adjusting the support rod.

The ability to control the rotational movement of the support rod independently of the longitudinal displacement thereof is employed advantageously so that one adjustment can be made without the user having to worry about whether the support rod will unintentionally move in a direction not desired. These independent adjustments also provide greater flexibility in doctors' ability to attend to their patentis' needs.

The present invention is designed primarily for use with various types of adjustable medical tables in common use for patient examination, surgery, and other medical treatment. Such equipment is commonly referred to as a "table" although in most cases it may also function as a bed or a chair depending upon the positions of the articulated sections and the particular medical and patient needs involved. These various medical tables include a track or rail to which a preferred embodiment of the present invention can be easily attached and released for movement along the rail.

A preferred embodiment of the present invention includes a housing having a pair of angularly displaced parallel slots formed therein for hanging the clamping assembly on the rail. Once the clamping assembly is placed on the rail, it is desirable to releasably secure the clamping assembly to the rail so the assembly remains stable when needed and so it can be readily moved along the rail if the situation calls for it.

To accomplish this, a preferred embodiment of the present invention is provided with a camming arrangement that is quickly and easily adjusted to either tighten or loosen the assembly relative to the rail. A cam handle is provided with a substantially cylindrical camming surface that urges a locking lug against the rail when the cam handle is rotated in one direction about its longitudinal axis. Consequently, when the handle is rotated in the other direction the locking lug is released from contacting the rail and the assembly may be moved. The camming arrangement is easily manipulated with one hand so the user's other hand is free to guide the assembly or attend to other responsibilities. Furthermore, the clamping assembly may be clamped over a protective drape whereas with previous designs it was necessary to punch a hole through the drape thereby breaking the sterile field.

As mentioned previously, when a medical accessory is connected to a medical table by a clamping assembly it is highly desirable to be able to adjust the rotation of the support rod supporting the accessory independently of the longitudinal displacement of the support rod. Many occasions dictate that one movement is required without the other. Independent adjustments are advantageous because the user may focus on completing one adjustment before beginning the other. If both adjustments need to be made simultaneously, the present invention can accommodate that need.

The housing of a preferred embodiment of the clamping assembly includes an aperture through which an adjustable rotating shaft is inserted. The proximal end of the shaft is near the table rail and the distal end is away from the rail. A portion of the shaft near the proximal end is threaded. The threaded portion has two diametrically opposed flat surfaces that interact with a toothed locking ring having corresponding flat surfaces. The toothed locking ring is placed upon the shaft between a locking nut and a set of teeth circumferentially disposed around the aperture of the housing. A compression spring is situated between the toothed locking ring and the housing to urge the toothed locking ring out of meshing engagement with the teeth of the housing when the locking nut is loosened. In this position, the support rod supporting a medical accessory may be rotated to the desired position.

To secure the support rod in a fixed rotational position relative to the housing the locking nut is tightened thereby urging the toothed locking nut into meshing engagement with the teeth of the housing. With the locking nut so tightened, the longitudinal displacement of the support rod may be independently adjusted.

An aperture is located substantially within the distal end of the shaft through which the support rod is inserted for supporting a medical accessory. A proximal rod locking ring and a distal rod locking ring are secured on the shaft, one on each side of the shaft aperture. The proximal rod locking ring is positioned so it abuts a shoulder formed by the end of the threaded portion of the shaft. Each locking ring has a notch formed across its diameter that substantially align with the aperture in the shaft. The notch of the proximal locking ring is substantially V-shaped so that the support rod may be urged into the V and held in place.

The diameter of the support rod is large enough so that when the handle is tightened the stem of the handle urges the support rod into the V-shaped notch to prevent the support rod from moving longitudinally. If longitudinal adjustment of the support rod is desired, the handle may be loosened slightly so the pressure of the stem is released from the support rod thereby allowing longitudinal displacement of the rod. The handle is triangular to provide sensitive control of the longitudinal displacement of the support rod.

As indicated by the foregoing discussion, the present invention is particularly advantageous because it provides for independent adjustment of the rotational and longitudinal movement of the rod supporting a medical accessory. Additionally, the clamping assembly may be readily secured to the rail of a medical table and subsequently released for movement along the rail. All of these features are carried out with a minimum of mechanical components that are reasonably easy to assemble and relatively inexpensive to manufacture.

BRIEF DESCRIPTION OF THE DRAWINGS

FIG. 1 is an exploded view of a preferred embodiment of the clamping assembly according to the present invention with portions shown in cross section for clarity.

DETAILED DESCRIPTION OF THE PREFERRED EMBODIMENT

Referring now to FIG. 1, there is shown a preferred embodiment of the clamping assembly 10. A housing 12 includes slots 13 and 14 for hanging the clamping assembly 10 on the rail of a medical table not shown. Typically, rails of medical tables or chairs are substantially rectangular and mounted to the table so their width is narrower than their height. Thus, slot 13 is placed over the width of the rail and the height of the rail is situated within slot 14. Alternatively, the arrangement of slots 13, 14 could be modified to accommodate the structure to which the clamping assembly 10 is to be attached.

The housing 12 is preferably a unitary construction made of T6061 aluminum, but other suitable materials could be used. Means for releasably securing the clamping assembly 10 to a rail is integrated with the housing 12. This means includes a first aperture 15 within said housing 12 into which a locking lug 16 is inserted. Additionally, means is provided for engaging said locking lug 16 against the rail of a medical table so that the clamping assembly 10 is rigidly held in place.

Means for engaging the locking lug 16 against the rail includes a first leg 18 and a second leg 20 each extending in a substantially perpendicular manner from a bottom ledge 22 of slot 14. First leg 18 includes a second aperture 24 and second leg 20 includes a third aperture 26; apertures 24, 26 being used to rotationally support a cam handle 28. Preferably, second aperture 24 is about 0.375 inches and third aperture 26 is about 0.5625 inches in inside diameter.

The cam handle 28 includes a distal shaft portion 29, a proximal shaft portion 30, and a center portion 32. Shaft portions 29, 30 have suitable diameters so that cam handle 28 is rotatably supported within apertures 24, 26. A set screw 33 is used to secure a camming member 34 to the center portion 32 after the cam handle 28 has been inserted through the apertures 22, 24.

The locking lug 16 is inserted within the first aperture 15 prior to the cam handle 28 being inserted through the apertures 22, 24. The camming member 34 includes a camming surface 40 that cammingly engages the locking lug 16 when the cam handle 28 is rotated about its longitudinal axis thereby urging the locking lug 16 against the rail of the medical table. Rotating the cam handle 28 in the opposite direction releases the locking lug 16 from the rail. Locking lug 16 preferably includes stepped portions 37 to accommodate rails having different heights. Alternatively, the locking lug 16 could include one step or be completely flat to accomodate the rail configuration. Camming member 34 is preferably cylindrical with a longitudinal groove 35 for interlocking the camming member 34 with the center portion 32 of the cam handle 28.

A rotatable shaft 42 is inserted through a fourth aperture 44 in the housing 12. The shaft 42 preferably has a length of about 3,625 inches and is made of stainless steel type 300. A recess 46 is formed in the housing 12 that cooperates with a flange 48 on the shaft 42 to prevent unwanted axial displacement of the shaft 42. The shaft 42 includes a threaded portion 50 that terminates and forms a shoulder 52. The threaded portion 50 is preferably of fine threads, about 0.875 inches in length and about 1.125 inches in outside diameter. A pair of diametrically opposed flat surfaces 51 (one surface 51 not shown) are located substantially on the threaded portion 50.

A reduced diameter portion 54 of shaft 42 extends from the shoulder 52 and forms the distal end 58 of the shaft 42. Preferably, reduced diameter portion has an outside diameter of about 1.00 inch. An aperture 56 is formed within the reduced diameter portion 54 of the shaft 42 through which a support rod (not shown) for hanging medical accessories extends. Aperture 56 may be various shapes to accomodate different types of support rods. The distal end 58 of the shaft 42 has an axial threaded shaft aperture 60 for receiving a handle 62 for adjusting the longitudinal displacement of the support rod which will be more fully described hereinafter.

Means for rotationally adjusting the shaft 42 about its longitudinal axis includes a toothed locking ring 64 disposed upon the shaft 42 in rotational engagement therewith. When shaft 42 is rotated so is the supported rod due to its insertion through aperture 56. A plurality of teeth 66 are circumferentially disposed on the housing 12 around the fourth aperture 44 that interact with the toothed locking ring 64. When the toothed locking ring 64 is in a first position it is maintained in locking relation with teeth 66 so that the toothed locking ring 64, the shaft 42, and consequently the support rod are prevented from rotating relative to the housing 12. When the toothed locking ring 64 is in a second position it is sufficiently spaced from teeth 66 so that the toothed locking ring 64, shaft 42, and the support rod may be rotated relative to the housing. Means is provided for moving the toothed locking ring 64 between the first position and the second position.

With shaft 42 inserted through fourth aperture 44 so that flange 48 abuts recess 46 a compression spring 68, a washer 69, and a locking nut 70 are placed on the shaft 42. The locking nut 70 includes a recessed cavity 72 for receiving the toothed locking ring 64. The washer 68 is placed within the cavity 72 so it is between the shoulder 74 and the toothed locking ring 64 to reduce the rotational friction exerted against the toothed locking ring 64 when the locking nut 70 is tightened.

The compression spring 68 is captured between a recess 76 of the housing 12 and a recess 78 formed on the toothed locking ring 64. The plurality of circumferentially disposed teeth 66 interact with a plurality of teeth 82 disposed on the toothed locking ring 64. Each tooth 66, 82 preferably forms an included angle of about 60° and has a base that forms an arc of about 9°.

The locking nut 70 includes an internally threaded aperture 84 that cooperates with the threaded portion 50 of the shaft 42. The exterior surface of locking nut 70 has longitudinal grooves to provide a suitable gripping surface for rotational purposes. The toothed locking ring 64 includes a pair of diametrically opposed flat surfaces 86 that align with the surfaces 51 so that the shaft 42 and the toothed locking ring 64 are locked in rotational engagement. When the locking nut 70 is rotated in one direction it urges the toothed locking ring 64 along the shaft 42 toward the housing 12 until the teeth 66, 82 are in meshing engagement. In this first position, the shaft 42 is prevented form rotating about its longitudinal axis and the support rod (not shown) is consequently prevented from rotating or swivelling relative to the housing 12.

When the locking nut 70 is rotated in the opposite direction the compression spring 68 urges the toothed locking ring 64 away from the housing 12 so that the toothed locking ring 64 and the shaft 42 may be rotated about the shaft's 42 longitudinal axis. The rotation of the shaft 42 may be incrementally metered by the interaction of the teeth 66, 82, i.e., when locking nut 70 is sufficiently loosened teeth 66, 82 are still slightly engaged but they are loose enough to allow the toothed locking ring 64 to be axially translated and simultaneously rotated.

When the shaft 42 is inserted through fourth aperture 44 and the locking nut 70 is engaged with the threaded portion 50, the shoulder 52 extends beyond the rear of the locking nut 70. Means is provided for regulating the longitudinal displacement of the support rod within aperture 56 of the shaft 42. This means includes a proximal rod locking ring 88 and a distal rod locking ring 90. The proximal rod locking ring 88 abuts the shoulder 52. The proximal and distal rod locking rings 88, 90 are secured to the shaft 42 in any conventional manner such as by allen screws. Each ring 88, 90 includes a diametric notch 92, 93 respectively. The locking rings 88, 90 are situated on the shaft 42 so that locking ring 88 is on one side of aperture 56 and locking ring 90 is on the other side of aperture 56 with the support rod situated within aperture 56 between the notches 92, 93. The notch 92 of ring 88 is substantially V-shaped so the support rod may be urged into the V and maintained in position. Notch 92 may be other shapes to accomodate the shape of the support rod if necessary. Means is provided for urging the support rod into the V-shaped notch 92.

The means for urging the support rod into the notch 92 of ring 88 includes a handle 62 that is preferably triangular. The handle 62 includes a threaded stem 94 that cooperates with the threaded shaft aperture 60. The threaded stem 94 is sufficiently long to extend into the aperture 56 of shaft 42. As handle 62 is tightened, the stem 94 engages the support rod and urges it toward the notch 92. The diameter of the support rod is sufficiently large so that it is captured between the notch 92 and the stem 94 when handle 62 is tightened. When handle 62 is loosened the support rod may be longitudinally adjusted within the aperture 56. Handle 62 is preferably shaped triangularly for easy manipulation by the user.

When the housing 12 is clamped to the rail or track it may be desirable to anchor the clamping assembly 10 to assure that it doesn't move if the cam handle 28 inadvertently disengages the locking lug 16 from the rail. A fifth aperture 98 is disposed within the housing 12 and has internal threads. A spring pin 100, bevel washers 102, and a tensioner 104 are inserted within the fifth aperture 98 so that the spring pin 100 abuts the top of the rail or track. Tensioner 104 is externally threaded to cooperate with the internal threads of aperture 98. When tensioner 104 is tightened the spring pin 100 is urged against the rail by the compression of the bevel washers. An identical arrangement (not shown) is provided in a sixth aperture (not shown) on the opposite side of the housing. When tensioner 104 is loosened, the spring pin 100 has no tension on the rail or other fixture.

While the preferred embodiment of the present invention is shown and described herein, it is to be understood that the same is not so limited but shall cover and include any and all modifications thereof which fall within the purview of the invention.

What I claim is:

1. A clamping assembly for connecting a support rod to a fixture, comprising:
   a housing;
   a shaft disposed through said housing, said shaft having a proximal end and a distal end, the support rod adjustably engaging said shaft so that the support rod may be independently longitudinally displaced, said longitudinal displacement of said support rod being generally transverse an axis defined by said shaft;
   means for releasably securing the housing to the fixture;
   means for regulating the longitudinal displacement of the support rod, said regulating means being releasably mounted on said shaft; and
   means for rotationally adjusting said shaft about its longitudinal axis and consequently the support rod relative to said housing, said adjusting means comprising a locking nut to releasably lock said shaft and rod from rotational movement, said locking nut being moveable from a first position wherein rotation of the shaft is prevented to a second position wherein rotation is allowed, said adjusting means for rotationally adjusting said shaft and said regulating means being capable of being operated independently of each other.

2. A clamping assembly as recited in claim 1, wherein said means for releasably securing said clamping assembly to the fixture comprises:
   a first aperture within said housing;
   a locking lug insertable within said first aperture; and
   means for engaging said locking lug against the fixture so that said clamping assembly is rigidly secured thereto.

3. A clamping assembly as recited in claim 2, wherein said means for engaging said locking lug against the fixture comprises:
   a first leg and a second leg extending from said housing;
   a second aperture within said first leg and a third aperture within said second leg;
   a cam handle rotationally journaled between said second and third apertures, said cam handle defining a longitudinal axis between said second and third apertures; and
   a cam having a camming surface rigidly connected to said cam handle, said locking lug being positioned in abutting relation with said camming surface so that when said cam handle is rotated about said longitudinal axis said locking lug is axially translated within said first aperture to either tighten or loosen said clamping assembly relative to the fixture.

4. A clamping assembly as recited in claim 3, wherein said shaft is disposed within a fourth aperture of said housing, said means for rotationally adjusting said shaft about its longitudinal axis and consequently the support rod relative to said housing comprises:
   a toothed locking ring disposed upon said shaft in rotational engagement therewith, said locking ring having a plurality of circumferentially disposed teeth facing said housing;
   a plurality of teeth circumferentially disposed around said fourth aperture in meshing alignment with said teeth of said locking ring; and
   means for moving said toothed locking ring between a first position where said toothed locking ring is maintained in locking engagement with said teeth disposed around said fourth aperture, and a second position where said toothed locking ring is urged away from said teeth disposed around said fourth aperture so that said toothed locking ring and said shaft may be rotated about said shaft's longitudinal axis.

5. A clamping assembly as recited in claim 4, wherein said shaft includes a threaded portion near its distal end, said means for moving said toothed locking ring between said first position and said second position comprises:
   said locking nut;
   a threaded aperture disposed within said locking nut that operatively communicates with said threaded portion of said shaft so that when said locking nut is rotated in one direction it urges said toothed locking ring into said first position whereby said toothed locking ring and said shaft are prevented from rotating about said shaft's longitudinal axis; and
   a compression spring disposed upon said shaft between said toothed locking ring and said housing for biasing said toothed locking ring away from said housing whereby when said locking nut is rotated in the opposite direction said compression spring urges said locking ring away from said housing into said second position whereby said toothed locking ring and said teeth of said housing are separated sufficiently to allow said toothed locking ring and said shaft to be rotated about said shaft's longitudinal axis.

6. A clamping assembly as recited in claim 4, wherein said shaft includes a pair of diametrically opposed flat surfaces near said proximal end, said locking nut includes a pair of internal diametrically opposed flat surfaces that align with said flat surfaces of said shaft so that said shaft and said locking nut are locked in rotational engagement with each other.

7. A clamping assembly as recited in claim 5, wherein said locking nut includes a recessed shoulder against which said toothed locking ring abuts, and said toothed locking ring includes a recessed shoulder against which one end of said compression spring abuts.

8. A clamping assembly as recited in claim 1, wherein the support rod is inserted through an aperture within said shaft located near said shaft's distal end, wherein said means for regulating the longitudinal displacement of the support rod comprises:
   a proximal rod locking ring disposed upon said shaft on one side of said aperture located within said shaft; and means for urging the support rod against said proximal rod locking ring so that the support rod is prevented from being longitudinally displaced.

9. A clamping assembly as recited in claim 8, wherein said proximal locking ring includes a substantially V-shaped notch disposed across its diameter for receiving the support rod.

10. A clamping assembly as recited in claim 8, wherein said distal end of said shaft is internally threaded, and said means for urging the support rod against said proximal locking ring comprises:
 a handle having a threaded stem that operatively cooperates with said internal threads of said shaft so that when said handle is rotated in one direction said stem engages the support rod and urges the support rod against said proximal locking ring so that the support rod is captured between said proximal locking ring and said stem thereby preventing the rod from being longitudinally displaced;
 when said handle is rotated in the opposite direction said stem is retracted from the support rod to allow longitudinal displacement of the support rod within said aperture of said shaft.

11. A clamping assembly as recited in claim 9, wherein said proximal locking ring abuts a shoulder on said shaft.

12. A clamping assembly as recited in claim 8, wherein said clamping assembly further comprises:
 means for anchoring said clamping assembly to the fixture.

13. A clamping assembly as recited in claim 12, wherein said housing includes a fifth and a sixth aperture each having internal threads, said anchoring means comprising:
 a pair of spring pins, one inserted within each of said fifth and sixth apertures;
 two combinations of bevel washers, one inserted within each of said fifth and sixth apertures; and
 a pair of externally threaded tensioners, one inserted within each of said fifth and sixth apertures, said tensioners adapted to urge said spring pins against the rail to anchor said clamping assembly in position.

14. A clamping assembly as recited in claim 10, wherein said handle is triangular.

15. A clamping assembly as recited in claim 2, wherein said locking lug includes a stepped end for engaging the fixture.

16. A clamping assembly as recited in claim 4, wherein each of said teeth disposed around said fourth aperture, and each of said teeth of said toothed locking ring forms an included angle of about 60° and has a base that forms an arc of about 9°.

* * * * *